July 16, 1957 R. A. WEIGEL 2,799,143
AIR CONDITIONING APPARATUS
Filed Oct. 7, 1954
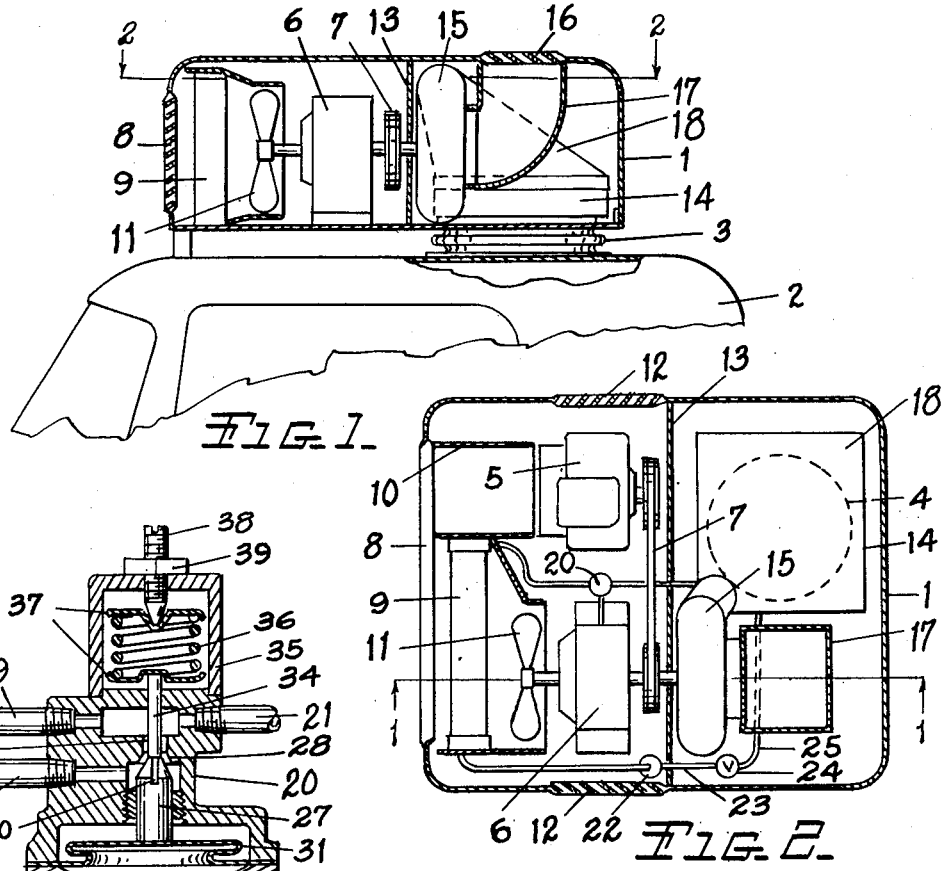
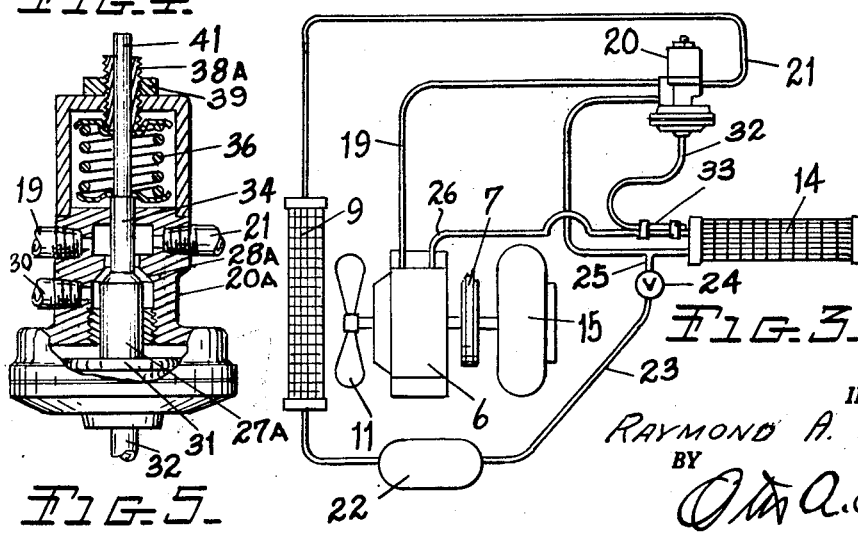
INVENTOR.
RAYMOND A. WEIGEL
BY
Otto A. Earl
Attorney.

United States Patent Office 2,799,143
Patented July 16, 1957

2,799,143
AIR CONDITIONING APPARATUS
Raymond A. Weigel, Cadillac, Mich., assignor to Kysor Heater Company, Cadillac, Mich.

Application October 7, 1954, Serial No. 460,855

11 Claims. (Cl. 62—3)

This invention relates to air conditioning apparatus. The principal objects of this invention are:

First, to provide an air conditioning apparatus which may be conveniently mounted on the cab of an automotive truck to operate automatically without requiring the attention of the driver and without requiring an objectionally large driving motor.

Second, to provide an air conditioning system operated by an economical low horse power engine and provided with an automatic unloading control so that increased demand on the cooling system over and above the capacity of the driving motor will not overload and stall the motor.

Third, to provide a novel control system for a refrigerating circuit which will unload the compressor and by-pass the expansion valve of the circuit when the cooling load applied to the evaporator rises to a predetermined level so that the refrigerating system cannot be overloaded and will continue to operate at a predetermined capacity without overloading its driving motor.

Fourth, to provide a refrigerating system that is self limiting in cooling capacity and self unloading when stopped so that a relatively small motor can operate the system over prolonged periods and at high ambient temperatures and so that the low power motor may be easily started without disconnecting the motor from the system.

Fifth, to provide a novel means for unloading the compressor of a refrigerating system so that the driving motor for the system can be started under no load condition.

Other objects and advantages of the invention will be apparent from a consideration of the following description and claims. The drawings illustrate a highly practicable form of air conditioning apparatus embodying the invention and two forms of by-pass valves adapted to be used in the system.

Fig. 1 is a fragmentary side elevational view of a motor truck cab with the air conditioning apparatus embodying the invention mounted on top thereof, the apparatus being shown partially in cross section along the plane of the line 1—1 in Fig. 2.

Fig. 2 is a horizontal cross sectional view through the apparatus taken along the plane of the line 2—2 in Fig. 1.

Fig. 3 is a schematic view of the refrigerating circuit used in the apparatus.

Fig. 4 is a cross sectional view through the relief valve shown in Figs. 2 and 3.

Fig. 5 is a cross sectional view through a modified form of relief valve which may be used in the refrigerating circuit.

Modern motor trucks now create so much heat in the driver's cab particularly in warm weather that refrigerating or air conditioning means for the cab are highly desirable. Refrigerating system operated from the truck engine require relatively complicated controls and mounting connections and refrigerating systems using presently known refrigerating circuits and separate motors require an excessively large driving motor in order that the refrigerating system and motor will not stall when heavily loaded by high atmospheric temperatures. As is set forth in the objects the present air conditioning and refrigerating apparatus is designed to permit mounting thereof as a package unit on the roof of the cab of a truck. The system utilizes a relatively small driving motor and will operate continuously without attention by the truck driver even though the heat load on the system becomes excessively great. Obviously the system may be used in other applications or surroundings but its function and advantages will be discussed in connection with its use on automotive trucks.

The apparatus includes a suitable casing 1 adapted to be mounted on the top of the cab 2 of an automotive truck. A tube 3 having a flexible bellows fold therein is adapted to conduct refrigerated air from the apparatus through a hole 4 provided therefor in the top of the cab.

Mounted in the forward half of the casing is a driving motor 5 of the low horse power air cooled gas engine type and a compressor 6. The compressor is connected to be continuously driven from the motor by a belt 7. The forward wall of the casing is provided with a louvered opening 8 through which air passes to the condenser 9 and a duct 10 leading to the cooling air intake for the gas engine. A fan 11 driven by the compressor 6 assures circulation through the condenser when the truck is stationary and air cooled gas engines are conventionally provided with integral blowers for the same purpose. Louvered exhaust openings 12 in the sides of the casing permit escape of the heated air.

Desirably a partition 13 divides the casing into front and rear compartments and in the rear compartment are mounted evaporator 14 and air circulating blower 15. The blower 15 receives fresh outside air through a louvered intake opening 16 in the top of the casing and the inlet duct 17 and directs the air through a hood 18 to the evaporator 14. After passing through the evaporator and being cooled thereby the air passes through the previously mentioned tube 3 to the cab of the truck. It would be possible to recirculate the air in the truck cab but due to the small volume of air in a truck cab and the danger of carbon monoxide accumulating or leaking into the cab it is perferred to operate the air conditioning system with entirely fresh air.

The refrigerating circuit is shown more clearly in Fig. 3 in which the output or high pressure side of the compressor 6 is connected by a conduit 19 to the by-pass valve 20. The conduit 19 opens directly through the by-pass valve to the conduit 21 extending to the inlet side of the condenser 9. From the condenser 9 the refrigerant is directed to a receiver 22 and from there through the conduit 23 to an expansion valve 24. The expansion valve 24 is an adjustable automatic pressure sensitive valve which passes liquefied refrigerant when the pressure in the evaporator reaches a predetermined amount. The valve 24 closes when the pressure in the evaporator falls below a preset value.

A conduit 25 connects the low pressure side of the expansion valve to the inlet side of the evaporator 14 and a suction conduit 26 connects the outlet side of the evaporator to the suction side of the compressor 6. The by-pass valve 20 has an automatically actuated valve member 27 adapted to close or seat in the valve seat 28 but which when open permits a by-pass flow of refrigerant from the conduit 19 through the port 29 of the by-pass conduit 30. The conduit 30 connects to the inlet side of the evaporator 14 along with the pipe 25 from the expansion valve.

The by-pass valve element 27 rests upon the expansible bellows 31 of a thermal sensing device including the sensing tube 32. The tube 32 extends to a temperature sensing bulb 33 secured in heat transfer relationship with the suction conduit 26 at the outlet side of the evaporator 14. Thus increase in temperature of refrigerant leaving the evaporator tends to increase the temperature and pressure in the sensing bulb 33 and bellows 31 to expand the bellows and close the valve element 27.

Closing motion of the valve element 27 is opposed and regulated by a push rod 34 extending through the body of the by-pass valve 20 to within a cap 35. A coil spring 36 is seated between end plates 27 and compressed between the push rod 34 and an adjusting screw 38 threaded through the top of the cap. A lock nut 39 clamps the screw 38 in adjusted position.

In operation of the air conditioning system the expansion valve 24 is selected or adjusted to admit refrigerant as required to obtain cooling action in the evaporator according to the capacity of the motor 5 and the compressor 6. The screw 38 and spring 36 on the by-pass valve are adjusted to permit the operating temperature of the suction conduit 26 and sensing element 33 to cause the bellows 31 to hold the by-pass valve 27 closed during normal operation of the system.

When abnormal operating conditions such as exceedingly high outside temperatures place an abnormal load on the evaporator 14 the compressor 6 attempts to meet the increased demand by pumping more refrigerant from the evaporator thus reducing the temperature and pressure in the suction line 26. This results in collapsing of the bellows 31 and opening of the by-pass valve 27 so that hot refrigerant from the compressor 19 is conducted directly to the evaporator through the by-pass conduit 30 until temperature and pressure conditions are reestablished within the evaporator that are within the capacity of the compressor and the engine or motor 5. It is thus impossible for high outside temperatures to stall the motor and the refrigerating system and continued cooling up to the capacity of the motor is obtained even though the temperature within the truck cab may increase somewhat with increased outside temperature.

The expansion device 24 at all times creates a pressure differential between the compression and suction sides of the compressor 6 which means that the motor 5 must be started initially under load and this condition is undesirable particularly when the motor is a gas engine of relatively low power. In order to relieve the starting load on the motor it is desirable that the by-pass valve element 27 or its coacting seat 28 be provided with a small groove 40. The groove 40 forms a restricted bleed passage that does not materially affect the operation of the system but it permits the two sides of the system to equalize in pressure during time that the motor is shut down. It is then possible to start the motor under no load conditions before the compressor builds up a pressure differential between the two sides of the system. Note in this connection that while the motor and compressor are being brought up to operating speed, the expansion valve 24 will close or remain closed due to the low pressure in the evaporator which results when the refrigerant which is all gaseous is quickly drawn out of the evaporator.

Fig. 5 illustrates a modified form of by-pass valve 20A having manually operable means for unloading the compressor to permit starting of the motor. The by-pass valve element 27A does not have any bleed groove therein and tightly closes on the valve seat 28. The adjusting screw 38A which adjusts the compression on the spring 36 is axially bored to receive a manually operable push pin 41 that extends through the spring into engagement with the plunger 34 so that the by-pass valve 27A can be manually unseated to equalize pressure in the refrigerating system until the motor is started and brought up to operating speed.

Having thus described the invention, what is claimed to be new and what is desired to be secured by Letters Patent is:

1. An air conditioning apparatus adapted to be mounted on the top of a motor vehicle comprising, a casing, an internal combustion motor mounted in said casing, a compressor connected to be driven by said motor, a blower connected to be driven by said motor and arranged to draw air from outside said casing, a condenser connected to the output of said compressor, a receiver connected to the output of said condenser, an evaporator connected to said receiver, a suction line connecting said evaporator to the suction side of said compressor, a pressure differential refrigerant control valve connected between said receiver and said evaporator, a by-pass valve connected in the connection between said compressor and said condenser and connected when opened to by-pass refrigerant from said compressor to the connection between said evaporator and said control valve, a thermo responsive device biasing said by-pass valve to closed position and having its thermally responsive element positioned adjacent said suction line to be responsive to the temperature of refrigerant leaving said evaporator, and a spring adjustably biasing said by-pass valve to open position, said by-pass valve having a constantly open restricted bleed passage formed therethrough between the output side of said compressor and said evaporator, said blower being arranged to discharge over said evaporator and deliver cold air through a hole provided therefor in the bottom of said casing.

2. An air conditioning apparatus adapted to be mounted on the top of a motor vehicle comprising, a casing, an internal combustion motor mounted in said casing, a compressor connected to be driven by said motor, a blower connected to be driven by said motor, a condenser connected to the output of said compressor, a receiver connected to the output of said condenser, an evaporator connected to said receiver, a suction line connecting said evaporator to the suction side of said compressor, a refrigerant control valve connected between said receiver and said evaporator, a by-pass valve connected in the connection between said compressor and said condenser and connected when opened to by-pass refrigerant from said compressor to the connection between said evaporator and said control valve, a thermo responsive device biasing said by-pass valve to closed position and having its thermally responsive element positioned adjacent said suction line to be responsive to the temperature of refrigerant leaving said evaporator, and a spring adjustably biasing said by-pass valve to open position, said blower being arranged to discharge over said evaporator and deliver cold air through a hole provided therefor in a wall of said casing.

3. An air conditioning apparatus adapted to be mounted on a motor vehicle comprising, a casing, an internal combustion motor mounted in said casing, a compressor connected to be driven by said motor, a blower connected to be driven by said motor, a condenser connected to the output of said compressor, a receiver connected to the output of said condenser, an evaporator connected to said receiver, a suction line connecting said evaporator to the suction side of said compressor, a pressure reducing refrigerant control valve connected between said receiver and said evaporator, a by-pass valve connected in the connection between said compressor and said condenser and connected when opened to by-pass refrigerant from said compressor to the connection between said evaporator and said control valve, a thermo responsive device having a bellows biasing said by-pass valve to closed position and having its thermally responsive element positioned adjacent said suction line to be responsive to the temperature of refrigerant leaving said evaporator, a spring adjustably biasing said by-pass valve to open position, and means forming a constantly open restricted bleed passage between the output side of said compressor and said evaporator, said blower being arranged to discharge over said evaporator and deliver cold air through a hole provided therefor in said casing.

4. An air conditioning apparatus adapted to be mounted on a motor vehicle comprising, a casing, an internal combustion motor mounted in said casing, a compressor connected to be driven by said motor, a blower connected to be driven by said motor, a condenser connected to the output of said compressor, an evaporator connected to said condenser, a suction line connecting said evaporator to the suction side of said compressor, a pressure reducing refrigerant control device connected between said condenser and said evaporator, a by-pass valve connected in the connection between said compressor and said condenser and connected when opened to by-pass refrigerant from said compressor to the connection between said evaporator and said control device, a thermo responsive device biasing said by-pass valve to closed position and having its thermally responsive element positioned adjacent said suction line to be responsive to the temperature of refrigerant leaving said evaporator, a spring adjustably biasing said by-pass valve to open position, and means forming a passage between the output side of said compressor and said evaporator, said blower being arranged to discharge over said evaporator and deliver cold air through a hole provided therefor in said casing.

5. An air conditioning apparatus comprising, a casing, an internal combustion motor mounted in said casing, a compressor connected to be driven by said motor, a blower connected to be driven by said motor, a condenser connected to the output of said compressor, an evaporator connected to said condenser, a suction line connecting said evaporator to the suction side of said compressor, a refrigerant control valve connected between said condenser and said evaporator, a by-pass valve connected between the output side of said compressor and the connection between said evaporator and said control valve, a regulating device biasing said by-pass valve to closed position and having an automatically operating actuating element associated with the suction line to be responsive to the temperature of refrigerant leaving said evaporator to decrease the biasing force on said by-pass valve upon decrease in the temperature in said suction line, and a spring adjustably biasing said by-pass valve to open position, said blower being arranged to discharge over said evaporator to deliver cold air through a hole provided therefor in said casing.

6. An air conditioning apparatus comprising, a casing, a motor mounted in said casing, a compressor connected to be driven by said motor, a blower, a condenser connected to the output of said compressor, an evaporator connected to said condenser, a suction line connecting said evaporator to the suction side of said compressor, a refrigerant control device connected between said condenser and said evaporator, a by-pass valve connected between the output side of said compressor and the connection between said evaporator and said control device, a regulating device biasing said by-pass valve to closed position and having an automatically operating actuating element associated with the suction line to be responsive to the condition of refrigerant leaving said evaporator to decrease the biasing force on said by-pass valve upon decrease in the temperature in said suction line, and a spring adjustably biasing said by-pass valve to open position, said blower being arranged to discharge over said evaporator to deliver cold air through a hole provided therefor in said casing.

7. A self limiting air conditioning system adapted to be continuously driven comprising, a compressor, a condenser, expansion valve and evaporator connected in a refrigerant circuating circuit with said compressor, a by-pass valve and conduit connected to by-pass refrigerant directly from said compressor to the inlet of said evaporator when said by-pass valve is open, a thermally responsive device positioned to be responsive to the temperature of refrigerant leaving said evaporator and connected to close said by-pass valve upon increase of temperature of the device, adjustable means biasing said by-pass valve to open position, and means for equalizing the pressure on opposite sides of said compressor prior to starting the compressor.

8. A self limiting air conditioning system adapted to be continuously driven comprising, a compressor, a condenser, pressure sensitive expansion valve and evaporator connected in a refrigerant circuating circuit with said compressor, a by-pass valve and conduit connected to by-pass refrigerant directly from said compressor to the inlet of said evaporator when said by-pass valve is open, a thermally responsive device positioned to be responsive to the temperature of refrigerant leaving said evaporator and connected to close said by-pass valve upon increase of temperature of the device, means biasing said by-pass valve to open position, and means forming a constantly open restricted bleed passage for equalizing the pressure on opposite sides of said compressor prior to starting the compressor.

9. A self limiting air conditioining system adapted to be continuously driven comprising, a compressor, a condenser, pressure sensitive expansion valve and evaporator connected in a refrigerant circulating circuit with said compressor, a by-pass valve and conduit connected to by-pass refrigerant directly from said compressor to the inlet of said evaporator when said by-pass valve is open, a thermally responsive device positioned to be responsive to the temperature of refrigerant leaving said evaporator and connected to close said by-pass valve upon increase of temperature of the device, an adjustable means biasing said by-pass valve to open position, and means including a manually operable control for said by-pass valve for equalizing the pressure on opposite sides of said compressor prior to starting the compressor.

10. A self limiting air conditioning system adapted to be continuously driven comprising, a compressor, a condenser, expansion valve and evaporator connected in a refrigerant circulating circuit with said compressor, a by-pass valve and conduit connected to by-pass refrigerant directly from said compressor to the inlet of said evaporator when said by-pass valve is open, an automatic regulating device positioned to be responsive to the temperature of refrigerant leaving said evaporator and connected to close said by-pass valve upon increase of temperature of the device, means biasing said by-pass valve to open position, and a manually operable control for said by-pass valve for equalizing the pressure on opposite sides of said compressor prior to starting the compressor.

11. A self unloading refrigerating system comprising, a motor, a compressor adapted to be driven by said motor, a condenser, pressure differential expansion valve and evaporator connected in a refrigerant circulating circuit with said compressor, a relief valve connected directly between said evaporator and the output side of said compressor, a control for said relief valve connected to close said valve upon increase of pressure in said evaporator above a predetermined level, and means forming a constantly open restricted bleed passage between the output and input sides of said compressor for equalizing the pressure on opposite sides of said compressor prior to starting the compressor.

References Cited in the file of this patent

UNITED STATES PATENTS

| | | |
|---|---|---|
| 2,080,288 | McCormack | May 11, 1937 |
| 2,252,300 | McGrath | Aug. 12, 1941 |
| 2,579,439 | Noe | Dec. 18, 1951 |
| 2,707,868 | Goodman | May 10, 1955 |